(12) United States Patent
MacKinnon et al.

(10) Patent No.: US 7,803,022 B2
(45) Date of Patent: Sep. 28, 2010

(54) THERMOCOUPLE CONNECTOR FOR JOINING THERMOCOUPLE WIRES

(75) Inventors: Andrew J. MacKinnon, Derby (GB);
Paul A. Carney, Sheffield (GB); Colin Bird, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/461,645

(22) Filed: Aug. 19, 2009

(65) Prior Publication Data
US 2010/0048065 A1  Feb. 25, 2010

(30) Foreign Application Priority Data
Aug. 21, 2008  (GB)  ............................ 0815210.0

(51) Int. Cl.
*H01R 13/502* (2006.01)
(52) U.S. Cl. ...................................... 439/695; 439/913
(58) Field of Classification Search ................ 439/695, 439/913
See application file for complete search history.

(56) References Cited

U.S. PATENT DOCUMENTS

| | | | |
|---|---|---|---|
| 2,542,651 A * | 2/1951 | Franklin et al. ............ | 310/347 |
| 4,133,700 A | 1/1979 | Hollander et al. | |
| 4,863,283 A | 9/1989 | Falk | |
| 5,161,892 A | 11/1992 | Shigezawa et al. | |
| 5,975,755 A | 11/1999 | Roberson | |
| 7,297,016 B1 * | 11/2007 | Tymkewicz et al. ......... | 439/459 |
| 2007/0161297 A1 | 7/2007 | Tymkewicz et al. | |

FOREIGN PATENT DOCUMENTS

| | | |
|---|---|---|
| EP | 1 533 869 A1 | 5/2005 |
| GB | 921026 | 3/1963 |
| GB | 1154864 | 6/1969 |
| JP | A-2001-141571 | 5/2001 |

* cited by examiner

*Primary Examiner*—Javaid Nasri
(74) *Attorney, Agent, or Firm*—Oliff & Berridge, PLC

(57) ABSTRACT

A thermocouple connector has a first member and a second member which couples to the first member. The first member carries two first terminals for electrically joining to the respective ends of a pair of thermocouple wires. The second member carries two corresponding second terminals for electrically joining to the respective ends of a pair of thermocouple extension wires. Each first terminal contacts a respective second terminal when the first and second members are coupled.

15 Claims, 3 Drawing Sheets

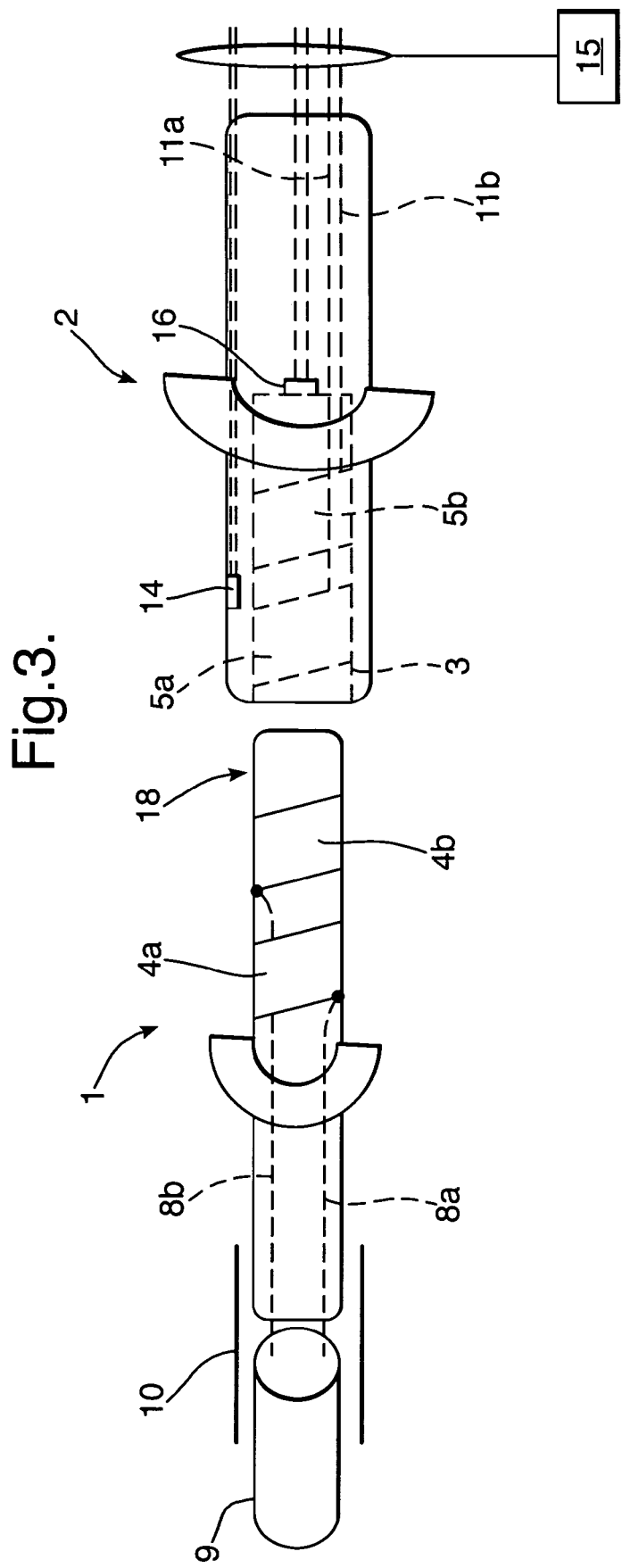

THERMOCOUPLE CONNECTOR FOR JOINING THERMOCOUPLE WIRES

BACKGROUND

The present invention relates to thermocouple connectors.

Thermocouples are a common form of contacting electrical sensor. They consist of two dissimilar metal wires, joined at their ends to form an electrical circuit. One of the junctions is attached to or embedded in the surface of the component to be measured and is referred to as the sensing or "hot" junction. The other is a reference or "cold" junction. Typically the two wires are formed into a single cable. The circuit generates a voltage due to the diffusion of electrons along the temperature gradient (the Seebeck effect), and traditionally materials have been chosen to give a voltage output approximately proportional to the difference in temperature between the two junctions. The small voltage generated is measured at the cold junction end using a voltmeter and is converted to a temperature using a calibration for cable type of the thermocouple. The cold junction temperature is usually measured with a resistance thermometer which is generally integral with a signal conditioning unit.

Cables are commonly supplied with responses conforming to internationally agreed tables within given tolerance bands, for example class 1 K and N type cable will produce the standard thermal e.m.f. response in the range −40 to >1000° C. to within a tolerance of ±1.5° C. or ±0.4% of reading. Increased accuracy can result from more accurately characterising individual thermocouples or a batch of cable from a single production run at points along its length ("batch wire calibration").

Voltages will also be produced at all junctions of dissimilar metals in the circuit wherever temperature differences arise. Thus, to minimise errors, connectors are available which use conductors fabricated from the same dissimilar metals as the thermocouple wires of the cable. Use of these connectors can maintain accuracy within the class 1 tolerance given above.

Known methods of providing disconnectable connections in thermocouple circuits include:—

Plugs and sockets made with screw-fit terminal materials matched to the particular thermocouple (e.g. push-fit connectors with trade names "Marlin" and "Mini-Marlin" connectors). These can be used with flexible polymer insulated cables (e.g. PTFE or polyimide insulation), and also with less flexible, mineral insulated (MI or MIC) cables for use at higher temperatures.

Pairs of thermocouple material contacts within multi-way connector housings.

Mineral insulated cables are commonly used for their high temperature resistance, but are generally more difficult to terminate than flexible polymer insulated cables. It is common practice to transition from mineral insulated cable to flexible polymer tails in order to more easily apply contacts for insertion into disconnectable connections and for crimp spade terminations.

However, the use of intermediate connections (even when the conductors are fabricated from the same dissimilar metals as the thermocouple wires) or joints within batch wire calibrated cable can still result in a loss of accuracy when there are temperature differences between joints.

Japanese patent application no. 2001141571 proposes a thermocouple connector with male-type and female-type terminals. U.S. Pat. No. 4,863,283 proposes an electrical connection for a thermocouple lance which includes a temperature sensor in the connector.

SUMMARY

A first aspect of the present invention provides a thermocouple connector having a first member and a second member which couples to the first member, the first member carrying two first terminals for electrically joining to the respective ends of a pair of thermocouple wires and the second member carrying two corresponding second terminals for electrically joining to the respective ends of a pair of thermocouple extension wires, each first terminal contacting a respective second terminal when the first and second members are coupled.

One of the first and second members is an elongate male member, and the other of the first and second members is a female member with a matching cavity for the male member, the male member being inserted into the cavity of the female member to couple the members. Such a connector can have a small cross-sectional area, allowing the connector to be passed through corresponding small gaps, which can be useful when forming complex assemblies. The first terminals can be axially spaced along the first member, and the second terminals axially spaced along the second member.

Preferably, one of the first and second members is formed of a thermally conducting material having a thermal conductivity of at least 75 W/mK, and preferably between 100 W/mK and 200 W/mK. Minimising or eliminating temperature differences between the terminals by adopting such a material can reduce errors caused by the connector in the temperature measured by the thermocouple. For example, the thermally conducting material can be aluminium nitride, aluminium oxide, beryllium oxide, boron nitride, silicon carbide, aluminium silicon carbide, diamond, or a composite material containing at least one of these materials. These materials advantageously have low electrical conductivities as well as high thermal conductivities.

Preferably, the male member is formed of the thermally conducting material. The other of the first and second members may be formed of a thermally insulating material, having a thermal conductivity of at most 20 W/mK, and preferably between 5 W/mK and 10 W/mK. Preferably, the thermally insulating material is any one or more of the group comprising acrylonitrile butadiene styrene, polyetheretherketone, polyamide, nylon, epoxy or a composite containing these materials with reinforcing fibres such as glass, carbon fibre. Particularly when the female member is formed of the thermally insulating material, the male member can then be shielded by the female member from ambient temperature gradients.

Preferably, the connector is arranged so that the ends of the thermocouple wires and the ends of the thermocouple extension wires directly contact their respective terminals in order to be electrically joined thereto, and each of the first and second terminals has no intermediate joints or connections between the point of direct contact with the respective wire end and the point of contact with the corresponding terminal of the other member. For example, each terminal may be formed from a single, homogeneous, body of material. By avoiding unnecessary joints or connections in the connector, it is also possible to reduce errors caused by the connector in the temperature measured by the thermocouple.

Typically, the materials of the first terminals are matched to materials of the respective thermocouple wires. However, the material of at least one (and preferably both) of the first terminals may be dissimilar to the material of the corresponding second terminal, whereby a cold junction is formed at the contact between the dissimilar materials, the connector further having a temperature sensor for measuring the temperature of the cold junction. In combination with a measurement of the electrical potential between the second terminals, the temperature measured by the sensor can be used to calculate the temperature of a hot junction formed by the thermocouple wires. More preferably, the second terminals are both formed of the same material.

In an alternative arrangement, the material of both the first terminals may be the same as the material of both the second terminals (for example copper), whereby a cold junction is formed at the contact between the ends of the thermocouple wires and the first terminals, the connector further having a temperature sensor for measuring the temperature of the cold junction. Again, in combination with a measurement of the electrical potential between the second terminals, the temperature measured by the sensor can be used to calculate the temperature of a hot junction formed by the thermocouple wires. However, in this arrangement it can be more difficult to control the characteristics of the cold junction.

Advantageously, the second terminals can be both formed, for example, from copper, rather than having to match the materials of the second terminals to those of the first terminals.

Preferably, the thermocouple connector further has a heater for changing the temperature of the cold junction. The heater can be used to change the temperature of the cold junction. This in turn allows the polarity of the second terminals to be determined, from which the particular thermocouple wire corresponding to a second terminal can be identified.

A further aspect of the present invention provides a thermocouple device having a pair of thermocouple wires connected to a pair of thermocouple extension wires by a connector according to the previous aspect.

The thermocouple device may be one in which the material of at least one of the first terminals is dissimilar to the material of the corresponding second terminal, whereby a cold junction is formed at the contact between the dissimilar materials, and the connector further has a temperature sensor for measuring the temperature of the cold junction. Such a device may further have:

a hot junction formed by the pair of thermocouple wires; and a processor unit remote from the connector which receives values for the potential difference between the second terminals, and values for the cold junction temperatures measured by the temperature sensor, the processor unit being adapted to calculate temperatures at the hot junction from the potential difference values, and the processor unit compensating for the cold junction temperatures when calculating the hot junction temperatures.

Another aspect of the present invention provides the first or the second member of the thermocouple connector of the first aspect.

BRIEF DESCRIPTION OF THE DRAWINGS

Embodiments of the invention will now be described by way of example with reference to the accompanying drawings in which:

FIG. 3 shows schematically a side view of another thermocouple connector.

DETAILED DESCRIPTION OF EMBODIMENTS

Figure 1:
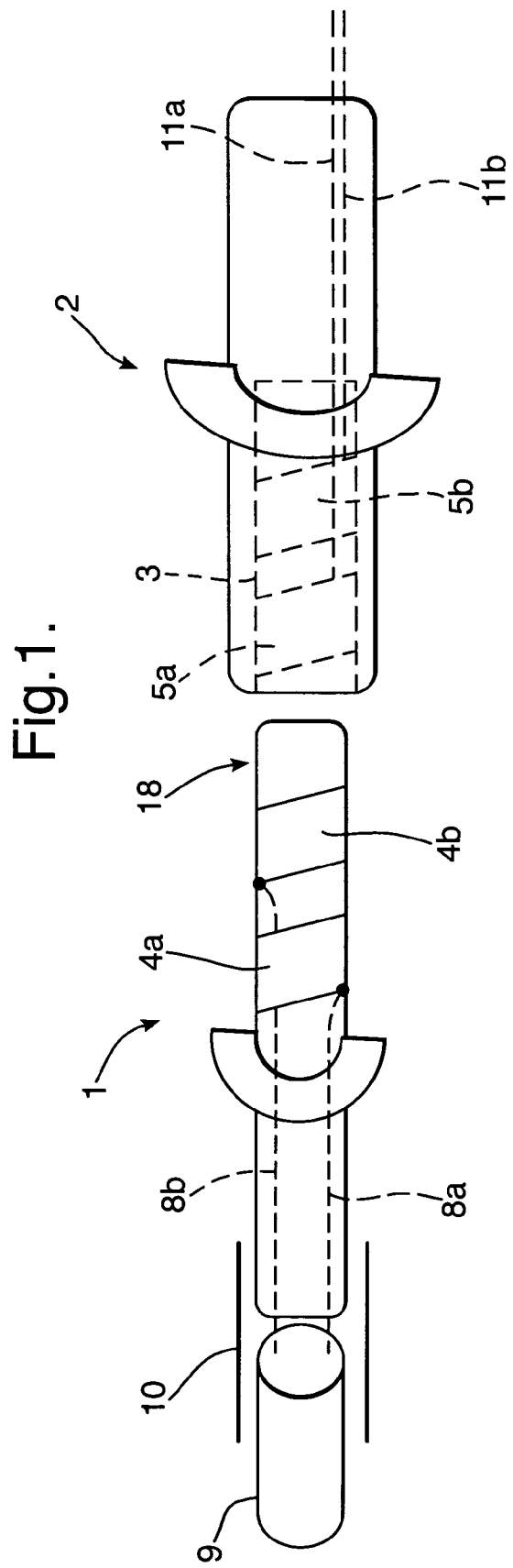
FIG. 1 shows schematically a side view of a thermocouple connector.

FIG. 1 shows schematically a side view of a thermocouple connector which is based on a space-saving compact pin design. The connector has an elongate male member 1 formed of electrically insulating material and a female member 2 formed of electrically insulating material, the female member having a matching cavity 3 into which the male member is inserted to couple the members.

The male member carries two axially-spaced terminals 4a, 4b, each terminal 4a, 4b forming an annulus of electrically conductive material around the circumference of the male member. Likewise, the female member carries two axially-spaced terminals 5a, 5b, each terminal 5a, 5b forming an annulus of electrically conductive material around the circumference of the cavity 3. The terminals are positioned so that when the male member is inserted into the cavity 3, terminal 4a faces and contacts to terminals 5a and terminal 4b faces and contacts to terminals 5b. The terminals can be formed from sections of thin metal sheet of tube, or can be plated or deposited as films.

Figure 2A:
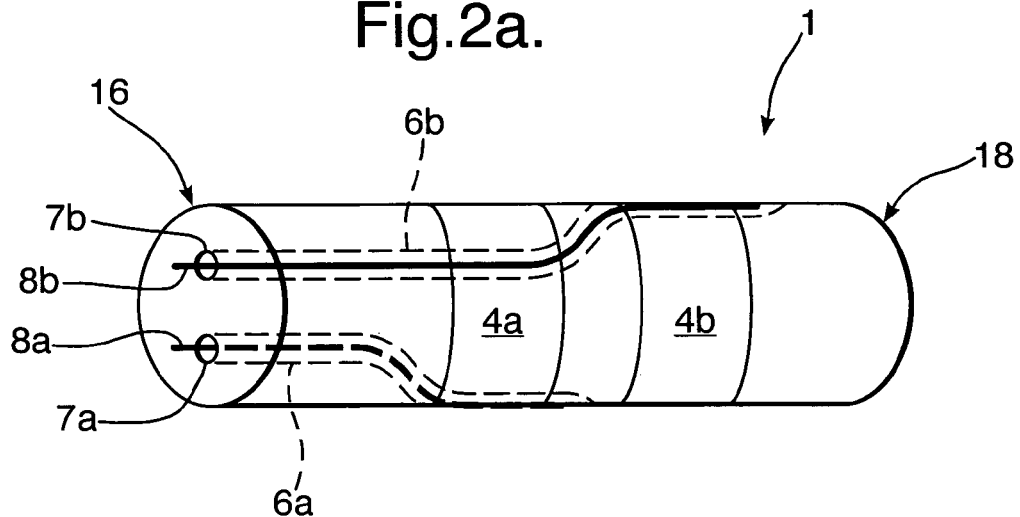
FIGS. 2a to 2c show detailed views of alternative configurations for the male member of the connector of FIG. 1.

FIG. 2a shows a detailed view of the male member 1. Within the male member 1 are two side-by-side passages 6a, 6b which extend from respective openings 7a, 7b at a distal end 16 to the insertion end 18 of the male member to arrive at the respective terminals 4a, 4b. Conveniently, the openings 7a, 7b have a spacing that is the same as the spacing between thermocouple wires 8a, 8b in a mineral insulated cable 9. It is thus straightforward to strip back the insulation from a length of the cable to expose the wires, which can then be pushed into the passages 6a, 6b to join the ends of the wires with the terminals 4a, 4b. A securing sleeve 10 can be bonded over the junction between the cable 9 and the distal end of the male member 1. The securing sleeve 10 also acts to prevent ingress of moisture or other contaminants. The male member 1 can also be used to terminate flexible polymer insulated thermocouple cables.

Similarly, within the female member 2 are two side-by-side passages (not shown) which extend from respective openings at the distal end of the female member to arrive at the respective terminals 5a, 5b. Again, the openings can have a spacing that is the same as the spacing between thermocouple extension wires 11a, 11b in an optional cable (not shown). The wires are pushed into the passages of the female member 2 to join the ends of the wires with the terminals 5a, 5b. If necessary, another securing sleeve (not shown) can be bonded over the junction between the optional cable and the distal end of the female member 2.

By providing both terminals 4a, 4b on one male member, the connector can have a small cross-sectional area, which can allow the connector to be pushed through correspondingly small holes. For example, thermocouples are used extensively in gas turbine engines to monitor engine temperatures. During engine build it is convenient to be able to pass thermocouple cables and their connectors through stuffing features. The compact pin design of the connector of FIG. 1 facilitates such usage.

As shown in FIG. 2a, the passages 6a, 6b in the male member 1 guide the thermocouple wires 8a, 8b directly into contact with the terminals 4a, 4b. It is thus unnecessary to provide any intermediate joints or connections between ends of the wires and the terminals. Furthermore, the terminals are formed from single, homogeneous, bodies of conductive material (which are typically the same material as that of the respective thermocouple wire to avoid forming cold junctions). A similar arrangement is adopted in the female member. In this way, only three electrical contact interfaces are formed in the connector (thermocouple wire to terminal, terminal to terminal, and terminal to thermocouple extension wire). As each interface is a potential source of error in a thermocouple measurement, the arrangement helps to reduce such errors.

Figure 2B:
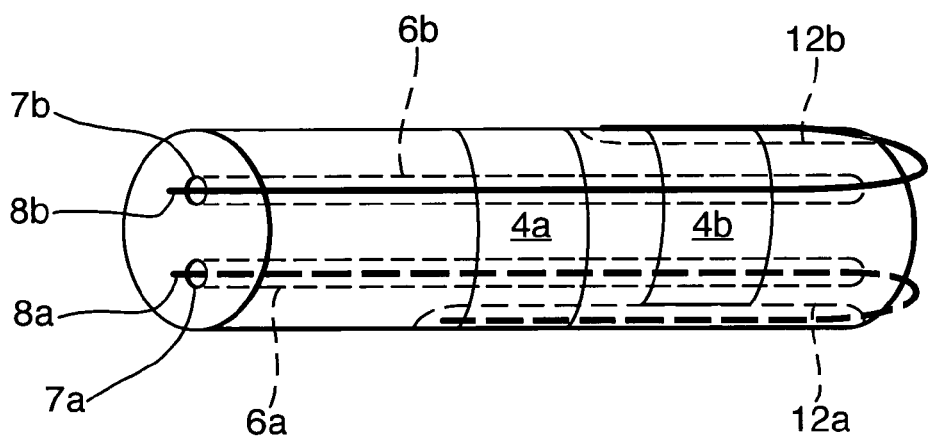
Figure 2C:
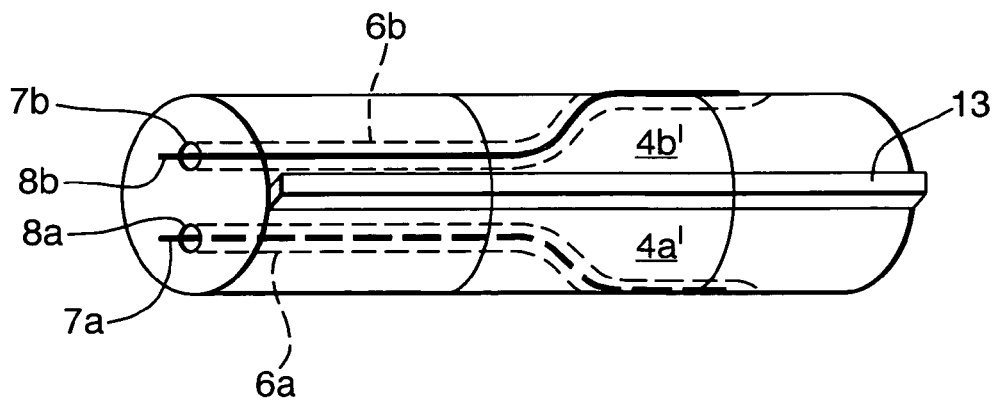

FIGS. 2b and 2c show detailed view of alternative configurations for the male member 1. Corresponding configurations can be adopted for the female member 2 as well.

In FIG. 2b the passages 6a, 6b in the male member 1 extend from end-to-end along the member. The thermocouple wires 8a, 8b are pushed through the passages to project from the proximal end of the member, and are then doubled back through further passages 12a, 12b to make direct contact with the terminals 4a, 4b.

In FIG. 2c the terminals 4a', 4b' are formed as axially side-by-side half annuli rather than axially spaced complete annuli. A keyway 13, and corresponding feature on the female member 2, ensures that the correct terminals on the male and female members are brought into contact.

The passages within which the wires are carried can open to the surface of the respective member at or adjacent the terminals (i.e. the passages become recessed groves). This permits access to the wires at the terminals, whereby, as an alternative to purely mechanical contact between the ends of the wires and the terminals, the wires can be welded to the terminals.

The electrically insulating material of the male member 1 preferably has a high thermal conductivity. For example, the material can be aluminium nitride, aluminium oxide, beryllium oxide, boron nitride, silicon carbide, aluminium silicon carbide, diamond, or a composite material containing at least one of these materials to produce the desired high thermal conductivity. Such materials prevent significant thermal gradients from building up between the terminals 4a, 4b. Further the closeness of the terminals helps to prevent them from experiencing different temperatures. Thus, as both terminals are at substantially the same temperature, a source of error in the temperature measured by the thermocouple wires 8a, 8b can be avoided or reduced.

Moreover, preferably the electrically insulating material of the female member 3 has a low thermal conductivity. For example, the material can be one of a variety of engineering polymer materials such as acrylonitrile butadiene styrene (ABS), polyetheretherketone (PEEK), polyamide, nylon, epoxy or a composite containing these materials with reinforcing fibres such as glass, carbon fibre other high modulus materials. The material may further comprise an outer shell of high strength material such as metal to produce a low thermal conductivity having the required physical strength and stiffness. In this way, the female member, which surrounds the male member, thermally insulates the male member to shield it from ambient temperature gradients, which again helps to avoid or reduce a source of error in the temperature measured by the electrical potential between the second terminals 5a, 5b.

The connector of FIG. 1 is shown as a stand alone item. However, it can be accommodated, along with other connectors, in a multi-way connector body. The body may also be formed of thermally insulating material to further shield the terminals from ambient temperature gradients.

FIG. 3 shows schematically a side view of another thermocouple connector which is also based on the space-saving compact pin design. Features which are identical or equivalent to those of the thermocouple connector of FIG. 1 have the same reference numbers in FIG. 3.

In the female member 2, the terminals 5a, 5b are now formed of a dissimilar material (such as copper) to that of the terminals 4a, 4b which are matched to thermocouple wires 8a, 8b. This allows the thermocouple extension wires 11a, 11b to be formed of the same dissimilar material. Although this arrangement is convenient, in that a ubiquitous material such as copper can be used for the extension wires and any further electrical connections, it produces a cold junction between terminals 4a and 5a and between terminals 4b and 5b.

To compensate for temperature variation in this cold junction, the female member 2 has a temperature sensor 14, such as a precision resistance thermometer, embedded in the female member 2 in close proximity to the terminals 5a, 5b, the sensor measuring the temperature of the junction. These temperature measurements are received by a remote processor unit 15, along with the e.m.f. measured between the terminals 5a, 5b. The size of the e.m.f. is determined by the temperature difference between the cold junction and a hot junction formed by the thermocouple wires 8a, 8b at the distal end of the cable 10. The measured cold junction temperatures, thus allow the processor unit to calculate the hot junction temperature from the measured e.m.f.

As both terminals 5a, 5b are formed of the same material, to avoid further cold junctions typically the extension wires 11a, 11b will also be formed of that material. However, it can then be problematic to distinguish between the extension wires, and in particular to identify which extension wire corresponds to which thermocouple wire 8a, 8b. To address this problem, the female member 2 has a heating element 16 at the end of the cavity 3. When the heating element is activated, the cold junction temperature increases and the effect of that increase on the polarity of the e.m.f. change at terminals 5a, 5b readily allows the identities of the thermocouple wires connected to the terminals 4a, 4b and their extension wires to be determined. Indeed, advantageously, the connection made with the connector can be assembled in either polarity, which can simplify assembly operations, and the heater 16 used to characterise the connection only at a later stage.

While the invention has been described in conjunction with the exemplary embodiments described above, many equivalent modifications and variations will be apparent to those skilled in the art when given this disclosure. For example, a female member can terminate the thermocouple wires and a male member can terminate the thermocouple extension wires. Accordingly, the exemplary embodiments of the invention set forth above are considered to be illustrative and not limiting. Various changes to the described embodiments may be made without departing from the spirit and scope of the invention.

The invention claimed is:

1. A thermocouple connector comprising:
    a first member; and
    a second member which couples to the first member, the first member carrying two first terminals for electrically joining to the respective ends of a pair of thermocouple wires and the second member carrying two corresponding second terminals for electrically joining to the respective ends of a pair of thermocouple extension wires, each first terminal contacting a respective second terminal when the first and second members are coupled, wherein
    one of the first and second members is formed of a thermally conducting material having a thermal conductivity of at least 75 W/mK, wherein the other of the first and second members is formed of a thermally insulating material having a thermal conductivity of at most 20 W/mK.

2. A thermocouple connector according to claim 1, wherein one of the first and second members is an elongate male member, and the other of the first and second members is a female member with a matching cavity for the male member, the male member being inserted into the cavity of the female member to couple the members.

3. A thermocouple connector according to claim 2, wherein the first terminals are axially spaced along the first member, and the second terminals are axially spaced along the second member.

4. A thermocouple connector according to claim 1, wherein one of the first and second members is formed of a thermally conducting material having a thermal conductivity between 100 W/mK and 200 W/mK.

5. A thermocouple connector according to claim 4, wherein the thermally conducting material is aluminium nitride, aluminium oxide, beryllium oxide, boron nitride, silicon carbide, aluminium silicon carbide, diamond, or a composite material containing at least one of these materials.

6. A thermocouple connector according to claim 4 wherein the male member is formed of the thermally conducting material.

7. A thermocouple connector according to claim 4, wherein the other of the first and second members is formed of a thermally insulating material having a thermal conductivity between 5 W/mK and 10 W/mK.

8. A thermocouple connector according to claim 7, wherein the thermally insulating material is any one or more of the group comprising acrylonitrile butadiene styrene, polyetheretherketone, polyamide, nylon, epoxy or a composite containing these materials with reinforcing fibres.

9. A thermocouple connector according to claim 1, wherein the connector is arranged so that the ends of the thermocouple wires and the ends of the thermocouple extension wires directly contact their respective terminals in order to be electrically joined thereto, and each of the first and second terminals has no intermediate joints or connections between the point of direct contact with the respective wire end and the point of contact with the corresponding terminal of the other member.

10. A thermocouple connector according to claim 9, wherein each terminal is formed from a single, homogeneous, body of material.

11. A thermocouple connector according to claim 1, wherein the material of at least one of the first terminals is dissimilar to the material of the corresponding second terminal, whereby a cold junction is formed at the contact between the dissimilar materials, the connector further having a temperature sensor for measuring the temperature of the cold junction.

12. A thermocouple connector according to claim 11, wherein the second terminals are formed of the same material.

13. A thermocouple connector according to claim 11, further having a heater for changing the temperature of the cold junction.

14. A thermocouple device according to claim 13, further having:
　a hot junction formed by the pair of thermocouple wires; and
　a processor unit remote from the connector which receives values for the potential difference between the second terminals, and values for the cold junction temperatures measured by the temperature sensor, the processor unit being adapted to calculate temperatures at the hot junction from the potential difference values, and the processor unit compensating for the cold junction temperatures when calculating the hot junction temperatures.

15. A thermocouple connector according to claim 1, wherein the material of both the first terminals is the same as the material of both the second terminals, whereby a cold junction is formed at the contact between the ends of the thermocouple wires and the first terminals, the connector further having a temperature sensor for measuring the temperature of the cold junction.

* * * * *